US012224600B2

(12) United States Patent
Moon et al.

(10) Patent No.: US 12,224,600 B2
(45) Date of Patent: Feb. 11, 2025

(54) ROBOT CHARGING APPARATUS

(71) Applicant: ELECTRONICS AND TELECOMMUNICATIONS RESEARCH INSTITUTE, Daejeon (KR)

(72) Inventors: Jung Ick Moon, Daejeon (KR); Sang-Won Kim, Daejeon (KR); Seong-Min Kim, Daejeon (KR); In Kui Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 617 days.

(21) Appl. No.: 17/502,674

(22) Filed: Oct. 15, 2021

(65) Prior Publication Data

US 2022/0140662 A1 May 5, 2022

(30) Foreign Application Priority Data

Nov. 3, 2020 (KR) .................. 10-2020-0145414

(51) Int. Cl.
*H02J 7/00* (2006.01)
*B60L 53/126* (2019.01)
*B60L 53/38* (2019.01)
*H02J 50/00* (2016.01)
*H02J 50/10* (2016.01)
(Continued)

(52) U.S. Cl.
CPC ............ *H02J 50/90* (2016.02); *B60L 53/126* (2019.02); *B60L 53/38* (2019.02); *H02J 50/005* (2020.01); *H02J 50/10* (2016.02); *H02J 50/40* (2016.02)

(58) Field of Classification Search
CPC .......... H02J 50/90; H02J 50/005; H02J 50/10; H02J 50/40; B60L 53/126; B60L 53/38
USPC .......................................... 320/108; 307/104
See application file for complete search history.

(56) References Cited

U.S. PATENT DOCUMENTS 5,821,731 A * 10/1998 Kuki ...................... B60L 53/14
320/108
2008/0133054 A1  6/2008  Kim et al.
(Continued)

FOREIGN PATENT DOCUMENTS

JP  2010-183804 A  8/2010
JP  2014-207859 A  10/2014
(Continued)

OTHER PUBLICATIONS

H. S. Kim, "Wirelessly charge the e-bike from a distance of 1m", Web Article, Jan. 2016.
(Continued)

*Primary Examiner* — Zixuan Zhou
(74) *Attorney, Agent, or Firm* — LRK PATENT LAW FIRM

(57) ABSTRACT

Provided is a robot charging apparatus to wirelessly charge a robot capable of walking, which includes a plurality of receiving coils fixed to legs of a robot and a transmitting coil moved and provided according to a position of the robot and wirelessly charges the robot in such a manner that the transmitting coil is provided between the plurality of receiving coils and coupled to the receiving coils by a magnetic field output from the transmitting coil.

14 Claims, 4 Drawing Sheets

(51) Int. Cl.
  *H02J 50/40* (2016.01)
  *H02J 50/90* (2016.01)

(56) References Cited

U.S. PATENT DOCUMENTS

2012/0306262 A1* 12/2012 Taguchi .................. H02J 50/12
                                                    307/104
2015/0088359 A1    3/2015 Choi et al.
2019/0363578 A1* 11/2019 Hume ...................... H02J 7/04

FOREIGN PATENT DOCUMENTS

JP   2019-136779 A   8/2019
KR   10-1650178 B1   8/2016

OTHER PUBLICATIONS

J. S. Kim, "Wireless power transmission technology applicable to nuclear power robots", Journal of the Electrical World/ Monthly Magazine, Nov. 2012.

* cited by examiner (a)

(b)

ROBOT CHARGING APPARATUS

CROSS-REFERENCE TO RELATED APPLICATION

This application claims the benefit of Korean Patent Application No. 10-2020-0145414 filed on Nov. 3, 2020, in the Korean Intellectual Property Office, the entire disclosure of which is incorporated herein by reference for all purposes.

BACKGROUND

1. Field of the Invention

One or more example embodiments relate to a robot charging apparatus and more particularly, to a robot charging apparatus that may wirelessly charge a robot capable of walking using wireless power transmission technology.

2. Description of Related Art

In general, a robot is used as a mobile device that loads or transports goods in an industrial field. Since the robot works while moving, the robot works in a relatively wide radius and is supplied with power by embedding a battery instead of being supplied with power in a wired manner. Therefore, in the case of using the battery, it is necessary to charge the battery when a predetermined period of time elapses.

The robot determines whether charging is required according to a state of charge of the battery, and when charging is required, is supplied with power through a charger capable of charging the robot. The robot is electrically connected to the charger to charge the battery.

However, in a conventional robot that is supplied with power from a charger through an electrically connectable contact part, a contact point of a robot side or a charger side is exposed to an outside, which causes an internal circuit of the battery or the robot to malfunction due to short. Also, unless a contact point of the robot and a contact point of the charger are exactly connected, charging may not be performed and a position of the robot needs to be accurately controlled.

To solve the above issue, proposed is a method of performing wireless charging by mounting a transmitter on a wall or a floor and by attaching a receiver on one side of a robot. However, the proposed method is for a mobile robot. Currently, with the development of robot technology, many robots capable of walking on two legs such as a humanoid are being developed. Therefore, there is a need for a charging scheme different from an existing charging scheme.

SUMMARY

Example embodiments provide a robot charging apparatus that may wirelessly transmit energy by moving and providing a transmitting coil between receiving coils fixed to legs of a robot, respectively, and, when a strong magnetic field occurs in the transmitting coil provided at the center, coupling the magnetic field to the receiving coils provided on the left and the right.

Example embodiments provide a robot charging apparatus that may supply power to a battery of a robot connected to a reception circuit inside the robot by detecting the robot that enters a space in which a transmitting coil for wireless charging is installed and by performing wireless charging while moving and providing a transmitting coil according to a position of the detected robot.

According to an aspect, there is provided a robot charging apparatus including a first receiving coil fixed to a first leg of a robot capable of walking; a second receiving coil fixed to a second leg of the robot spaced apart from the first leg of the robot and coupled to the first receiving coil; and a transmitting coil installed in a charging body that interacts with the robot and moved and provided according to a position of the robot to which the first receiving coil and the second receiving coil are fixed. The transmitting coil is installed inside or outside a wall constituting a space that allows wireless charging of the robot, and moved and provided according to the position of the robot.

The transmitting coil may be moved and provided between the first receiving coil and the second receiving coil fixed to the first leg and the second leg of the robot, respectively, and may output a magnetic field according to a separation distance between the first receiving coil and the second receiving coil.

The transmitting coil may be moved and provided according to the position of the robot when the first receiving coil and the second receiving coil fixed to the first leg and the second leg of the robot, respectively, approach within a chargeable range based on the wall on which the charging body is installed.

The transmitting coil may be provided extending horizontally from the wall to a point at which the first receiving coil and the second receiving coil fixed to the first leg and the second leg of the robot, respectively, are present, with a length of a coil support coupled to the charging body being adjusted.

The transmitting coil may be provided sliding to a point at which the first receiving coil and the second receiving coil fixed to the first leg and the second leg of the robot, respectively, are present, along a rail installed on a floor of the space.

According to another aspect, there is provided a robot charging apparatus including a first receiving coil fixed to a first leg of a robot capable of walking; a second receiving coil fixed to a second leg of the robot spaced apart from the first leg of the robot and coupled to the first receiving coil; and a transmitting coil installed in a charging body that interacts with the robot and moved and provided according to a position of the robot to which the first receiving coil and the second receiving coil are fixed. The transmitting coil is installed inside or outside a floor constituting a space that allows wireless charging of the robot, and moved and provided according to the position of the robot.

The transmitting coil may be moved and provided between the first receiving coil and the second receiving coil fixed to the first leg and the second leg of the robot, respectively, and may induce a magnetic field to be coupled to the first receiving coil and the second receiving coil.

The transmitting coil may be moved and provided to be perpendicular to the floor when the first receiving coil and the second receiving coil fixed to the first leg and the second leg of the robot, respectively, approach within a chargeable range that allows wireless charging.

The transmitting coil may be moved and provided to be perpendicular to the floor as one side of the transmitting coil is fixed to the charging body and an angle of inclination of the transmitting coil is formed by a spring provided to another side of the transmitting coil to which the charging body is not fixed.

The transmitting coil may be moved from the floor to a point at which the first receiving coil and the second receiving coil are fixed to the first leg and the second leg of the robot, respectively, are present, rotating in a horizontal direction by a first rotating member provided on the floor and then, moved and provided between the first leg and the second leg of the robot, rotating in a direction perpendicular to a direction of rotation of the first rotating member by a second rotating member connected to the first rotating member.

According to still another aspect, there is provided a robot charging apparatus including a first receiving coil fixed to a first leg of a robot capable of walking; a second receiving coil fixed to a second leg of the robot spaced apart from the first leg of the robot and coupled to the first receiving coil; and a transmitting coil installed in a charging body that interacts with the robot and moved and provided according to a position of the robot to which the first receiving coil and the second receiving coil are fixed. The transmitting coil is moved from a first wall to a second wall of the second wall of a space that allows wireless charging of the robot according to a position of the robot that moves the space.

The transmitting coil may be moved and provided between the first receiving coil and the second receiving coil fixed to the first leg and the second leg of the robot, respectively, and may output a magnetic field according to a separation distance between the first receiving coil and the second receiving coil.

The transmitting coil may be moved and provided rotating from the first wall to the second wall by a coil support coupled to the charging body, depending on whether the robot enters the space.

The transmitting coil that is moved and provided may be provided at a desired interval from the second wall to be inserted between the first receiving coil and the second receiving coil fixed to the first leg and the second leg of the robot, respectively. Additional aspects of example embodiments will be set forth in part in the description which follows and, in part, will be apparent from the description, or may be learned by practice of the disclosure.

According to example embodiments, a robot charging apparatus provides a charging scheme suitable for wirelessly charging a humanoid type robot without exposing a wireless charging system.

According to example embodiments, a robot charging apparatus does not use a separate metal plate for grounding to reduce an electromagnetic wave of a transmitting coil and thus, enables a miniaturization, a thinness, and a lightness of the transmitting coil.

According to example embodiments, a robot charging apparatus may reduce a direction or an electromagnetic wave of a transmitting coil without attenuating the transmission efficiency of a magnetic field by symmetrically providing receiving coils on the left and the right based on the transmitting coil and by using legs of the robot as a shield.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
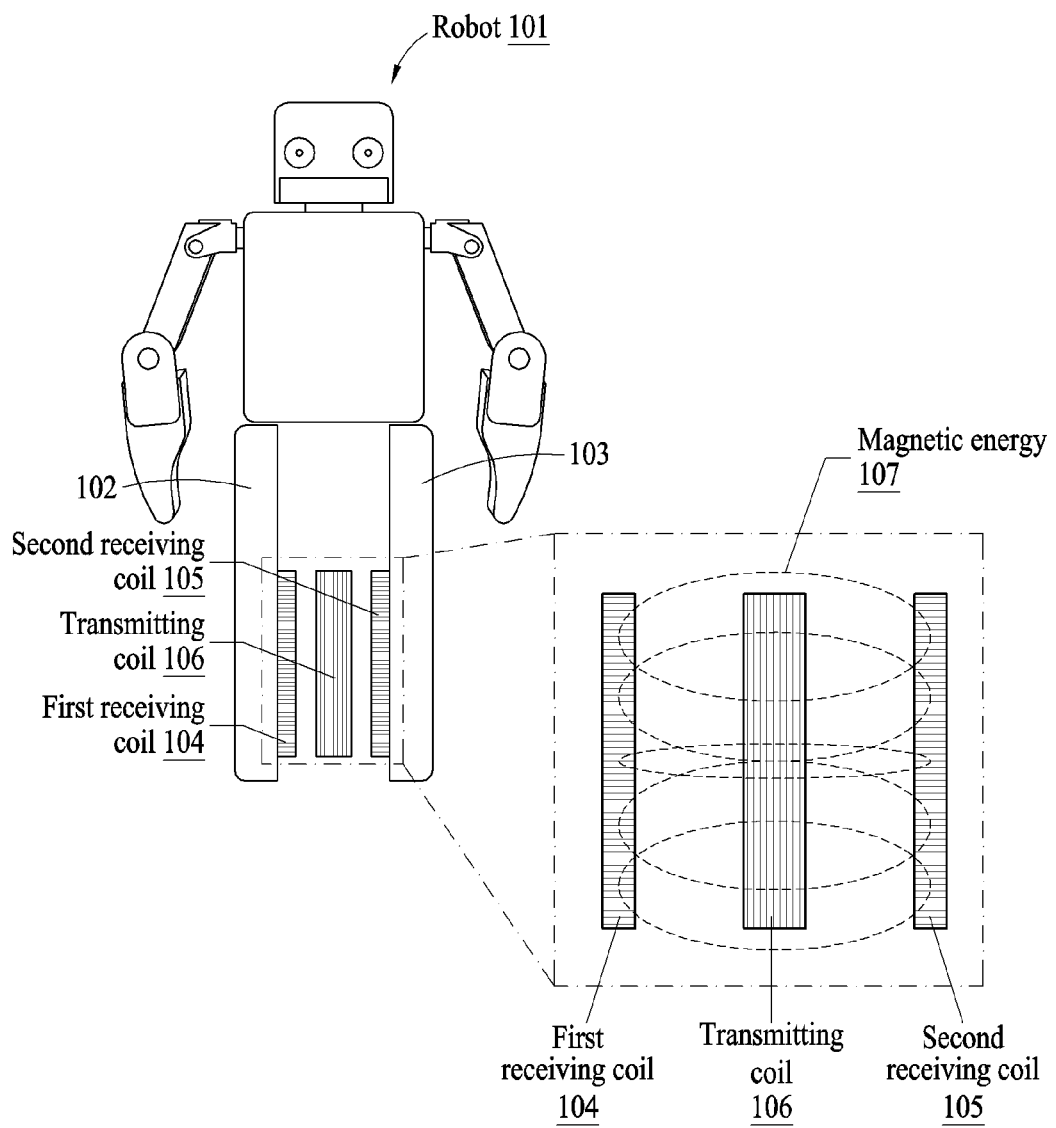
FIG. 1 illustrates a concept of wirelessly charging a robot according to an example embodiment.

The following structural or functional descriptions of example embodiments described herein are merely intended for the purpose of describing the example embodiments described herein and may be implemented in various forms. Therefore, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" or "accessed" to another component, it may be understood that the one component is directly connected or accessed to another component or that still other component is interposed between the two components.

As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

FIG. 1 illustrates a concept of wirelessly charging a robot according to an example embodiment.

Referring to FIG. 1, a robot charging apparatus may wirelessly charge a battery of a power source embedded in a robot 101 using wireless power transmission technology. The robot charging apparatus may include a first receiving coil 104 and a second receiving coil 105 mounted to the robot 101 and a transmitting coil 106 provided according to positions of the first receiving coil 104 and the second receiving coil 105 in a space that allows wireless charging of the robot 101. For example, the robot charging apparatus may refer to a device that performs wireless charging on a humanoid robot capable of multi-legged walking or bipedal walking.

In detail, the first receiving coil 104 and the second receiving coil 105 of the robot charging apparatus may be mounted to both legs 102 and 103 of the robot 101, respectively. The first receiving coil 104 and the second receiving coil 105 may be provided on inner sides of the legs 102 and 103 of the robot 101, respectively, to increase a contact surface with the transmitting coil 106. The first receiving coil 104 and the second receiving coil 105 of the robot charging apparatus may be symmetrically mounted to left and right legs of the robot 101 and may refer to coils having the same mechanical or electrical characteristics. The first receiving coil 104 and the second receiving coil 105 may be connected to receiving circuits mounted inside the robot 101 and may supply power to the battery that is the power source of the robot 101.

For example, the first receiving coil 104 for wireless charging may be mounted to the left leg of the robot 101 and the second receiving coil 105 for wireless charging may be mounted to the right leg of the robot 101.

The transmitting coil 106 may be installed in a charging body that interacts with the robot 101. The charging body may be a device that induces wireless charging with the first receiving coil 104 and the second receiving coil 105 by inducing alternating current (AC) voltage that flows in the transmitting coil 106. For example, the charging body may be a transmitting circuit. The transmitting circuit may be installed under the floor, behind a wall, or at a position designated by a user as a separate module depending on a place and a position for performing wireless charging with the first receiving coil 104 and the second receiving coil 105.

The transmitting coil 106 may be moved and provided according to a position of the robot 101 to which the first receiving coil 104 and the second receiving coil 105 are fixed in a space. Here, a position to which the transmitting coil 106 is to be moved may be between the legs 102 and 103 of the robot 101 to which the first receiving coil 104 and the second receiving coil 105 are mounted, that is, at the center. The transmitting coil 106 may measure a separation distance from the first receiving coil 104 and the second receiving coil 105 of the robot 101 that enters the space and may be moved and provided when the first receiving coil 104 and the second receiving coil 105 are present within a chargeable range.

When a magnetic field occurs in the transmitting coil 106 in a state in which the transmitting coil 106 is provided relative to the first receiving coil 104 and the second receiving coil 105, the magnetic field may be coupled to the first receiving coil 104 and the second receiving coil 105 and the robot charging apparatus may wirelessly transmit energy to the first receiving coil 104 and the second receiving coil 105. As the magnetic field is coupled to the first receiving coil 104 and the second receiving coil 105 and the transmitting coil 106, magnetic energy 107 accumulated in each coil may be formed and the power source of the robot 101 may be charged accordingly.

In detail, the magnetic field that occurs in the transmitting coil 106 may pass through the center of the first receiving coil 104 and the second receiving coil 105 aligned in a direction parallel to the center of the transmitting coil 106 and, through this, may induce voltage in the first receiving coil 104 and the second receiving coil 105 by an electromagnetic induction phenomenon. It may increase efficiency of power transmission since most magnetic field (magnetic line) passes through a receiving coil when centers of transmitting and receiving coils are well matched.

Here, wireless charging may be performed by mounting the first receiving coil 104 and the second receiving coil 105 to the legs 102 and 103 of the robot 101, respectively, and by providing the transmitting coil 106 between the first receiving coil 104 and the second receiving coil 105. Through this, power may be wirelessly supplied to the battery of the robot 101 while solving an issue caused by a defective contact point between the robot 101 and a charger, which is found in the related art.

Figure 2:
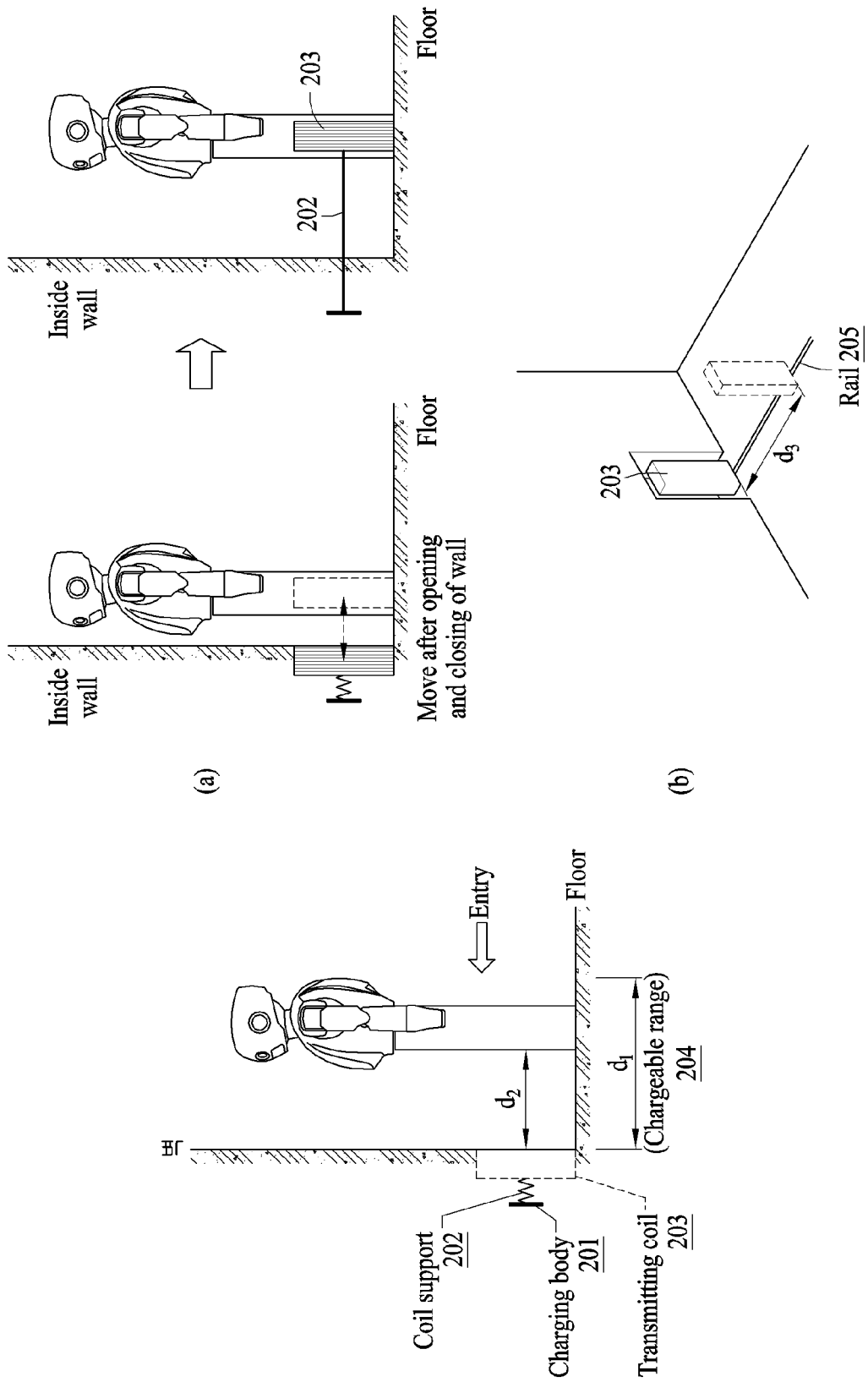
FIG. 2 illustrates an example of describing a robot approach scheme of a transmitting coil for wireless charging according to an example embodiment.

FIG. 2 illustrates an example of describing a robot approach scheme of a transmitting coil for wireless charging according to an example embodiment.

Referring to FIG. 2, a transmitting coil 203 of a wireless charging apparatus may be installed inside or outside a wall constituting a space that allows wireless charging of a robot. In detail, the transmitting coil 203 may be installed in a charging body 201 that includes a transmitting circuit, and the transmitting coil 203 and the charging body 201 may be connected by a coil support 202. Here, the coil support 202 may be a device configured to support the transmitting coil 203 for charging of the robot capable of walking in various forms. The transmitting coil 203 may be coupled at an end of the coil support 202, and the charging body 201 may fine-tune a position of the transmitting coil 203 coupled at the end of the coil support 202 up and down and left and right.

Here, the charging body 201 may interact with a sensor (not shown) capable of verifying a position of the robot that enters a chargeable range $d_1$ 204 in the space and the sensor may be attached on the wall in the space in which the charging body 201 is installed, or on one surface of the charging body 201. For example, the sensor may be a laser sensor. The charging body 201 may detect a distance between the robot entering the chargeable range $d_1$ 204 and the transmitting coil 203 through a signal received from the sensor. When the robot is present within a separation distance $d_2$ in which wireless charging is possible, the charging body 201 may control the coil support 202 such that the transmitting coil 203 coupled at the end of the coil support 202 may be provided at the center between a first receiving coil and a second receiving coil mounted to legs of the robot, respectively.

In detail, a transmitter (or charging body) that includes a transmitting coil may communicate with a receiver (reception circuit) of the robot and, to this end, may include a module and various types of sensors. According to an example embodiment, as communication between the transmitter and the receiver is performed, it is possible to verify that the confirmed receiver that is entering a space is approaching.

Here, an accurate position and alignment of the receiver depends on a function of the receiver (robot). For example, the receiver may be aligned to detect a marker on the transmitter (wall) or may be aligned using an ultrasound or an image sensor. Also, although the receiver is slightly out of alignment, wireless charging may be performed. Therefore, if the receiver (robot) approaches within a preset alignment range, wireless charging may be automatically performed.

That is, the transmitting coil 203 may be moved and provided when the first receiving coil and the second receiving coil fixed to the legs of the robot approach within the chargeable range $d_1$ 204 based on the wall on which the charging body 201 is installed.

Referring to (a) of FIG. 2, the transmitting coil 203 may be provided extending horizontally from the wall to a point at which the first receiving coil and the second receiving coil fixed to the legs of the robot, respectively, are present, with a length of the coil support 202 coupled to the charging body

201 being adjusted. Here, since a position of the transmitting coil 203 for wireless charging is between the legs of the robot, a moving distance of the transmitting coil 203 may be predetermined.

Here, when the transmitting coil 203 is provided inside the wall, a shield (not shown) installed on the wall is opened and closed and then the transmitting coil 203 may be provided at the center between the first receiving coil and the second receiving coil mounted to the legs of the robot, respectively, while being minutely adjusted by the charging body 201. Also, when the transmitting coil 203 is provided outside the wall, the transmitting coil 203 may be provide at the center between the first receiving coil and the second receiving coil without a separate opening and closing operation.

Referring to (b) of FIG. 2, the transmitting coil 203 may be moved and provided using a rail 205 installed on the floor of the space in a state of being coupled to the coil support 202. That is, the transmitting coil 203 may be provided sliding to a point at which the first receiving coil and the second receiving coil fixed to the legs of the robot, respectively, are present, along the rail 205 installed on the floor of the space. The rail 205 installed on the floor may include a separate cover to minimize damage by exposure. Also, the rail 205 installed on the floor includes a magnetic function. Therefore, a logistics robot coupled with a magnetic tape may approach a position at which wireless charging is possible along a predetermined line or lane.

The transmitting coil 203 may be moved and provided between the first receiving coil and the second receiving coil fixed to the legs of the robot, respectively, and may output a magnetic field according to a separation distance between the first receiving coil and the second receiving coil.

Figure 3:
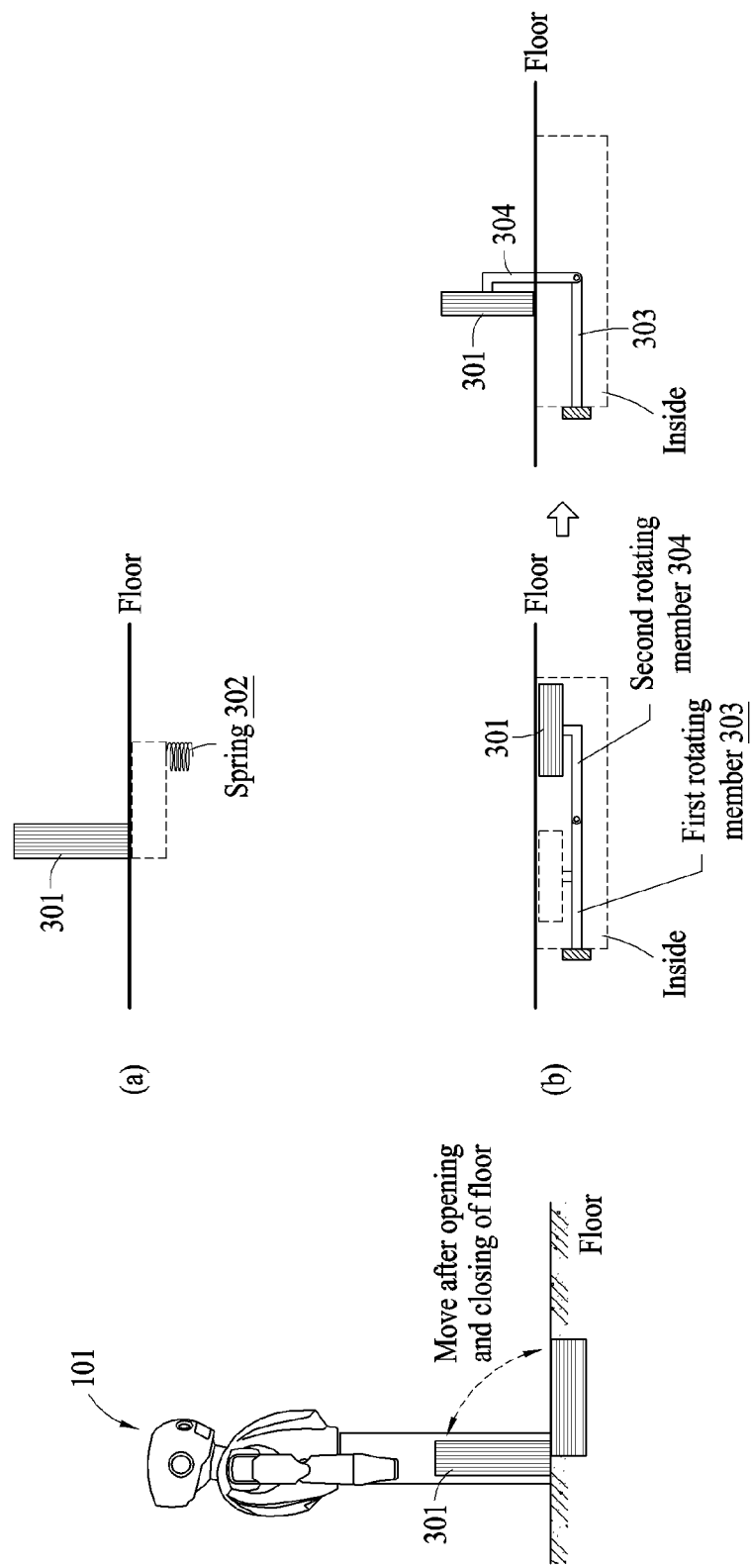
FIG. 3 illustrates another example of describing a robot approach scheme of a transmitting coil for wireless charging according to an example embodiment.

FIG. 3 illustrates another example of describing a robot approach scheme of a transmitting coil for wireless charging according to an example embodiment.

Referring to FIG. 3, a transmitting coil 301 of a wireless charging apparatus may be installed inside or outside a floor constituting a space that allows wireless charging of a robot 101. Here, if the transmitting coil 301 is installed under the floor and the robot for charging approaches in an environment in which it is easy to build the transmitting coil 301 under the floor, the floor may open and the transmitting coil 301 may rotate or move vertically to prepare for wireless charging.

The transmitting coil 301 may be in a state of being coupled with a charging body that includes a transmitting circuit. The charging body may interact with a sensor configured to determine whether the robot enters. Here, the sensor may be a pressure sensor configured to determine presence or absence of the robot that enters within a chargeable range. The sensor may detect a change caused by a weight applied to the floor as the robot enters and may transfer the detected signal to the charging body. The charging body may move and provide the transmitting coil 301 to be perpendicular to the floor based on the space in which a first receiving coil and a second receiving coil are fixed to legs of the robot, respectively, based on the signal received from the sensor.

Referring to (a) of FIG. 3, one side of the transmitting coil 301 may be fixed to the charging body and a spring may be fixed to another side of the transmitting coil 301 to which the charging body is not fixed. When the robot enters the chargeable range, an angle of inclination may be formed in the transmitting coil 301 by the spring formed on one side of the transmitting coil 301 and the transmitting coil 301 may be moved and provided to be perpendicular to the floor according to the formed angle of inclination. Through this, elastic energy may apply impact to the transmitting coil 301 and the transmitting coil 301 may be moved and provided to be perpendicular to the floor according to the impact applied to the transmitting coil 301.

Referring to (b) of FIG. 3, the transmitting coil 301 may interact with a first rotating member 303 that performs a linear motion and a second rotating member 304 that performs a right angle motion. One surface of the first rotating member 303 may be coupled to the charging body and the other surface of the first rotating member 303 may be coupled to the second rotating member 304. One surface of the second rotating member 304 may be coupled to the transmitting coil 301.

The first rotating member 303 may move and provide the transmitting coil 301 from the floor to a point at which the first receiving coil and the second receiving coil are fixed to the legs of the robot, respectively, rotating in a horizontal direction, by the charging body. Here, a position of the transmitting coil 301 may be moved to a point preset in consideration of a length of the second rotating member 304.

Once the transmitting coil 301 is moved to the preset point, the second rotating member 304 may move and provide the position of the transmitting coil 301 to be between the legs of the robot, rotating in a direction perpendicular to a direction of rotation of the first rotating member.

Figure 4:
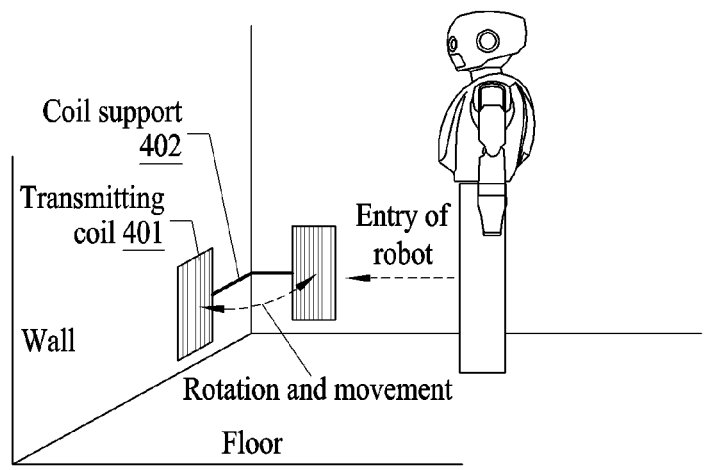
FIG. 4 illustrates still another example of describing a robot approach scheme of a transmitting coil for wireless charging according to an example embodiment.
Figure 4:
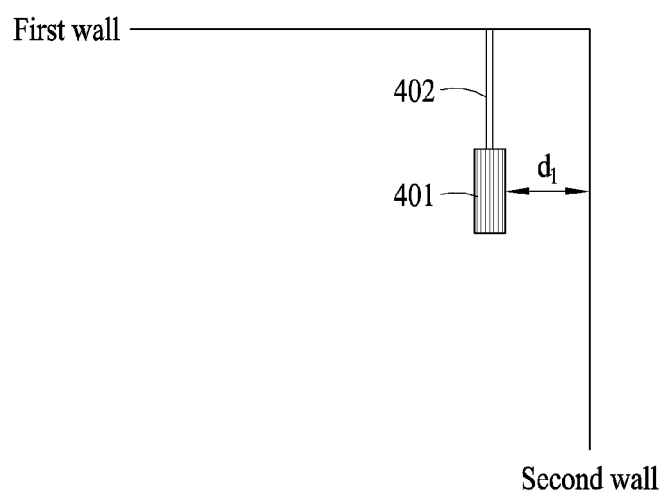

FIG. 4 illustrates still another example of describing a robot approach scheme of a transmitting coil for wireless charging according to an example embodiment.

Referring to FIG. 4, a transmitting coil 401 of a wireless charging apparatus may be installed on a wall that allows wireless charging of a robot 101. According to an example embodiment, the transmitting coil 401 may be attached to the wall and, when the robot approaches for charging, may rotate and move by a hinge or a coil support 402 such that the transmitting coil 401 may be positioned between legs of the robot.

Referring to (a) of FIG. 4, the transmitting coil 401 of the wireless charging apparatus may be installed on the wall to be movable from a first wall to a second wall of a space that allows wireless charging of the robot according to a position of the robot that moves the space.

Referring to (b) of FIG. 4, the transmitting coil 401 that is moved and provided may be provided at a desired interval $d_1$ from the second wall to be inserted between a first receiving coil and a second receiving coil fixed to legs of the robot, respectively.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The example embodiments described herein may be implemented using hardware components, software components, and/or a combination thereof. For example, the apparatuses, methods, and components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combinations thereof, to independently or collectively instruct or configure the processing device to operate as desired. Software and/or data may be embodied permanently or temporarily in any type of machine, component, physical equipment, virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter.

The described hardware devices may be configured to act as one or more software modules in order to perform the operations of the above-described example embodiments, or vice versa.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A robot charging apparatus comprising:
a first receiving coil fixed to a first leg of a robot capable of walking;
a second receiving coil fixed to a second leg of the robot spaced apart from the first leg of the robot and coupled to the first receiving coil; and
a transmitting coil installed in a charging body that interacts with the robot and moved and provided according to a position of the robot to which the first receiving coil and the second receiving coil are fixed,
wherein the transmitting coil is installed inside or outside a wall constituting a space that allows wireless charging of the robot, and moved and provided according to the position of the robot between the first receiving coil and the second receiving coil fixed to the first leg and the second leg of the robot, respectively.

2. The robot charging apparatus of claim 1, wherein the transmitting coil outputs a magnetic field according to a separation distance between the first receiving coil and the second receiving coil.

3. The robot charging apparatus of claim 1, wherein the transmitting coil is moved and provided according to the position of the robot when the first receiving coil and the second receiving coil fixed to the first leg and the second leg of the robot, respectively, approach within a chargeable range based on the wall on which the charging body is installed.

4. The robot charging apparatus of claim 1, wherein the transmitting coil is provided sliding to a point at which the first receiving coil and the second receiving coil fixed to the first leg and the second leg of the robot, respectively, are present, along a rail installed on a floor of the space.

5. A robot charging apparatus comprising:
a first receiving coil fixed to a first leg of a robot capable of walking;
a second receiving coil fixed to a second leg of the robot spaced apart from the first leg of the robot and coupled to the first receiving coil; and
a transmitting coil installed in a charging body that interacts with the robot and moved and provided according to a position of the robot to which the first receiving coil and the second receiving coil are fixed,
wherein the transmitting coil is installed inside or outside a wall constituting a space that allows wireless charging of the robot, and moved and provided according to the position of the robot, and
wherein the transmitting coil is provided extending horizontally from the wall to a point at which the first receiving coil and the second receiving coil fixed to the first leg and the second leg of the robot, respectively, are present, with a length of a coil support coupled to the charging body being adjusted.

6. A robot charging apparatus comprising:
a first receiving coil fixed to a first leg of a robot capable of walking;
a second receiving coil fixed to a second leg of the robot spaced apart from the first leg of the robot and coupled to the first receiving coil; and a transmitting coil installed in a charging body that interacts with the robot and moved and provided according to a position of the robot to which the first receiving coil and the second receiving coil are fixed, wherein the transmitting coil is installed inside or outside a floor constituting a space that allows wireless charging of the robot, and moved and provided according to the position of the robot between the first receiving coil and the second receiving coil fixed to the first leg and the second leg of the robot, respectively.

7. The robot charging apparatus of claim 6, wherein the transmitting coil induces a magnetic field to be coupled to the first receiving coil and the second receiving coil.

8. The robot charging apparatus of claim 6, wherein the transmitting coil is moved and provided to be perpendicular to the floor when the first receiving coil and the second receiving coil fixed to the first leg and the second leg of the robot, respectively, approach within a chargeable range that allows wireless charging.

9. The robot charging apparatus of claim 8, wherein the transmitting coil is moved and provided to be perpendicular to the floor as one side of the transmitting coil is fixed to the charging body and an angle of inclination of the transmitting coil is formed by a spring provided to another side of the transmitting coil to which the charging body is not fixed.

10. The robot charging apparatus of claim 8, wherein the transmitting coil is moved from the floor to a point at which the first receiving coil and the second receiving coil are fixed to the first leg and the second leg of the robot, respectively, are present, rotating in a horizontal direction by a first rotating member provided on the floor and then, moved and provided between the first leg and the second leg of the robot, rotating in a direction perpendicular to a direction of rotation of the first rotating member by a second rotating member connected to the first rotating member.

11. A robot charging apparatus comprising:
a first receiving coil fixed to a first leg of a robot capable of walking;
a second receiving coil fixed to a second leg of the robot spaced apart from the first leg of the robot and coupled to the first receiving coil; and
a transmitting coil installed in a charging body that interacts with the robot and moved and provided according to a position of the robot to which the first receiving coil and the second receiving coil are fixed,
wherein the transmitting coil is moved from a first wall to a second wall of the second wall of a space that allows wireless charging of the robot according to a position of the robot that moves the space, and
wherein the transmitting coil is moved and provided between the first receiving coil and the second receiving coil fixed to the first leg and the second leg of the robot, respectively.

12. The robot charging apparatus of claim 11, wherein the transmitting coil outputs a magnetic field according to a separation distance between the first receiving coil and the second receiving coil.

13. The robot charging apparatus of claim 11, wherein the transmitting coil is moved and provided rotating from the first wall to the second wall by a coil support coupled to the charging body, depending on whether the robot enters the space.

14. The robot charging apparatus of claim 13, wherein the transmitting coil that is moved and provided is provided at a desired interval from the second wall to be inserted between the first receiving coil and the second receiving coil fixed to the first leg and the second leg of the robot, respectively.

* * * * *